J. D. GARLICK.
COMPOSITION FOR RUBBING AND FINISHING VARNISHED AND OTHER SURFACES.
APPLICATION FILED MAY 13, 1912.

1,077,957. Patented Nov. 4, 1913.

Witnesses
Grace E. Wynkoop.
Richard C. English.

Inventor
James D. Garlick
By J. E. Thomas
Attorney

UNITED STATES PATENT OFFICE.

JAMES D. GARLICK, OF SAGINAW, MICHIGAN.

COMPOSITION FOR RUBBING AND FINISHING VARNISHED AND OTHER SURFACES.

1,077,957.  Specification of Letters Patent.  Patented Nov. 4, 1913.

Application filed May 13, 1912. Serial No. 696,873.

*To all whom it may concern:*

Be it known that I, JAMES D. GARLICK, citizen of the United States, residing at Saginaw, county of Saginaw, State of Michigan, have invented a certain new and useful Improvement in Compositions for Rubbing and Finishing Varnished and other Surfaces, and declare the following to be a full, clear, and exact description of the same, such as will enable others skilled in the art to which it pertains to make and use the same, reference being had to the accompanying drawings, which form a part of this specification.

My invention relates to means for rubbing and finishing varnished and other highly polished surfaces and consists of a composition of matter molded into suitable blocks to be used for this purpose,—the object being to produce by its use a finished surface superior to that now obtained by pumice or rotton stone alone; eliminating thereby the liability of accidental scratches which frequently occur through the employment of the latter medium.

Figure 1:
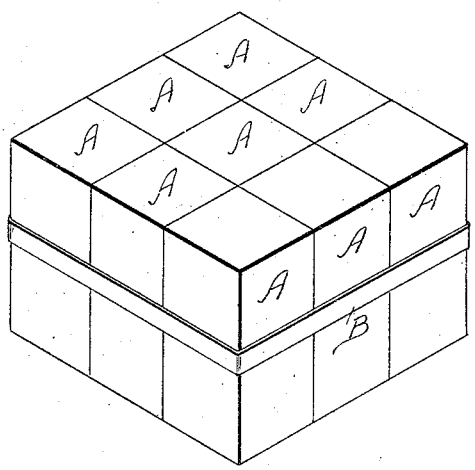
Figure 2:
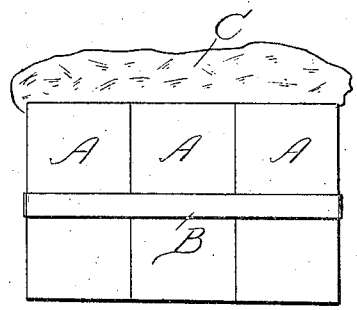

In the drawings accompanying this specification:—Figure 1 is a perspective view showing a plurality of blocks banded together for use by the operator. Fig. 2 is a side elevation of the same with a pad of cotton covering one end of the blocks.

Referring now to the letters of reference placed upon the drawings:—A denotes the blocks; B the band, and C the tuft or pad of cotton.

My composition consists of the ingredients hereinafter named and while the proportions may be varied in order to produce a polishing element especially adapted for different kinds of work, that given will be found satisfactory for general use on automobiles and carriage bodies and the usual run of cabinet work.

Liquid shellac (shellac dissolved in alcohol) 1 part; linseed oil, 1 part; fine grit (pulverized pumice stone or emery), 8 parts.

These ingredients after being thoroughly mixed are molded into relatively small blocks and are then dried:—this will make what I term a "soft" stone suitable for certain classes of work. The blocks may be tempered to varying degrees of hardness by baking them in a suitable oven,—the baking being in accordance with the degree of hardness desired.

While I prefer to use linseed oil any suitable oil may be employed or it may be dispensed with entirely;—the oil, however, produces a softer stone of block especially desirable on certain classes of work.

I have found that by employing shellac in combination with fine grit in the manner indicated, a finish may be obtained much superior to that secured by grit or pumice stone alone.

In using these blocks I prefer to band a plurality of them together in the manner indicated in Fig. 1, the operator placing a pad of cotton over the ends of the blocks grasped by the hand —the object being to permit a slight movement of the blocks with respect to each other when being rubbed over the surface to be finished, in order that the ends of the blocks may adjust themselves to the surface being finished, the cotton pad providing means for maintaining an equal pressure on all the blocks while permitting them to severally adjust themselves to the work.

Having thus described my invention, what I claim is:—

A polishing block formed of bolted pumice stone mixed with shellac dissolved in alcohol and linseed oil and molded into a block, said block being dried in the air and oven baked after drying.

In testimony whereof, I sign this specification in the presence of two witnesses.

JAMES D. GARLICK.

Witnesses:
 JOE TROY,
 JOHN A. SOUTLER.